US012603691B2

(12) United States Patent     (10) Patent No.:   US 12,603,691 B2

Wu et al.     (45) Date of Patent:    Apr. 14, 2026

(54) FAILURE CANCELLATION RECORDING

(71) Applicant: Nokia Technologies Oy, Espoo (FI)

(72) Inventors: Chunli Wu, Beijing (CN); Samuli Turtinen, Ii (FI); Malgorzata Tomala, Wroclaw (PL)

(73) Assignee: Nokia Technologies, Espoo (FI)

( * ) Notice: Subject to any disclaimer, the term of this patent is extended or adjusted under 35 U.S.C. 154(b) by 379 days.

(21) Appl. No.: 18/033,126

(22) PCT Filed: Oct. 22, 2020

(86) PCT No.: PCT/CN2020/122927
§ 371 (c)(1),
(2) Date: Apr. 21, 2023

(87) PCT Pub. No.: WO2022/082640
PCT Pub. Date: Apr. 28, 2022

(65) Prior Publication Data
US 2023/0396303 A1    Dec. 7, 2023

(51) Int. Cl.
| | |
|---|---|
| *H04B 7/06* | (2006.01) |
| *H04L 41/0631* | (2022.01) |
| *H04L 41/0659* | (2022.01) |
| *H04L 43/0823* | (2022.01) |
| *H04W 24/10* | (2009.01) |

(52) U.S. Cl.
CPC ..... *H04B 7/06964* (2023.05); *H04L 41/0631* (2013.01); *H04L 41/0661* (2023.05); *H04L 43/0823* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 7,853,683 | B1 | 12/2010 | Dini et al. | |
| 9,848,351 | B2 * | 12/2017 | Han ....................... | H04L 5/0091 |
| 10,211,960 | B2 * | 2/2019 | Davydov .............. | H04W 52/16 |
| 10,833,753 | B2 * | 11/2020 | Cirik ..................... | H04W 76/19 |

(Continued)

FOREIGN PATENT DOCUMENTS

| | | |
|---|---|---|
| CN | 103119868 A | 5/2013 |
| CN | 105265004 A | 1/2016 |

(Continued)

OTHER PUBLICATIONS

Office action received for corresponding Chinese Patent Application No. 202080106573.6, dated Jul. 16, 2024, 9 pages of office action and no page of translation available.

(Continued)

*Primary Examiner* — Melvin H Pollack
(74) *Attorney, Agent, or Firm* — Lippes Mathias LLP

(57) ABSTRACT

Embodiments of the present disclosure relate to recording of failure cancellation. The first device detects a cancellation of a reporting of a failure for a transmission between the first device and a second device. Then, in accordance with a determination that the cancellation of the reporting of the failure is detected, the first device records information concerning the cancellation. As such, the first device is able to provide the recorded information on failure cancellation to the second device when needed.

20 Claims, 4 Drawing Sheets

100

102
103
120
110

(56) References Cited

U.S. PATENT DOCUMENTS

| | | | | |
|---|---|---|---|---|
| 11,626,918 | B2 * | 4/2023 | Chin | H04W 52/0216 370/329 |
| 11,632,165 | B2 * | 4/2023 | Wu | H04W 16/28 370/329 |
| 11,632,197 | B2 * | 4/2023 | Chin | H04L 1/1822 370/329 |
| 11,632,774 | B2 * | 4/2023 | Yang | H04L 5/0064 370/329 |
| 11,647,404 | B2 * | 5/2023 | Ji | H04L 5/0094 370/225 |
| 11,665,566 | B2 * | 5/2023 | Pezeshki | H04L 1/1864 370/329 |
| 11,838,781 | B2 * | 12/2023 | Freda | H04W 76/19 |
| 11,863,373 | B2 * | 1/2024 | Tsai | H04L 41/0816 |
| 11,950,279 | B2 * | 4/2024 | Cirik | H04W 74/0808 |
| 11,991,572 | B2 * | 5/2024 | Tseng | H04W 36/00838 |
| 12,003,310 | B2 * | 6/2024 | Kang | H04B 7/061 |
| 12,003,983 | B2 * | 6/2024 | Lee | H04L 5/0032 |
| 12,022,507 | B2 * | 6/2024 | Wang | H04W 74/0808 |
| 12,035,164 | B2 * | 7/2024 | Lee | H04L 5/0057 |
| 12,068,982 | B2 * | 8/2024 | Zhang | H04B 1/74 |
| 12,074,678 | B2 * | 8/2024 | Matsumura | H04W 76/19 |
| 12,075,492 | B2 * | 8/2024 | He | H04W 52/36 |
| 12,101,158 | B2 * | 9/2024 | Huang | H04W 16/28 |
| 12,113,742 | B2 * | 10/2024 | Zhang | H04L 5/0051 |
| 12,127,058 | B2 * | 10/2024 | Hong | H04W 36/249 |
| 12,127,270 | B2 * | 10/2024 | Rune | H04W 74/0841 |
| 12,149,317 | B2 * | 11/2024 | Svedman | H04B 7/06964 |
| 12,149,476 | B2 * | 11/2024 | Li | H04B 7/06964 |
| 12,150,003 | B2 * | 11/2024 | Ishii | H04W 76/15 |
| 12,150,178 | B2 * | 11/2024 | da Silva | H04B 7/06964 |
| 12,166,562 | B2 * | 12/2024 | Tran | H04B 7/06964 |
| 12,176,988 | B2 * | 12/2024 | Miao | H04B 7/06964 |
| 12,185,404 | B2 * | 12/2024 | Tsai | H04B 17/318 |
| 12,192,747 | B2 * | 1/2025 | Da Silva | H04W 24/08 |
| 12,206,617 | B2 * | 1/2025 | Panteleev | H04W 72/1268 |
| 12,207,252 | B2 * | 1/2025 | Bae | H04W 72/1268 |
| 12,212,981 | B2 * | 1/2025 | Park | H04W 28/0278 |
| 12,231,204 | B2 * | 2/2025 | Zeng | H04W 56/001 |
| 12,231,874 | B2 * | 2/2025 | Chang | H04W 36/362 |
| 12,244,456 | B2 * | 3/2025 | Cirik | H04W 72/046 |
| 12,244,492 | B2 * | 3/2025 | Ramachandra | H04L 45/42 |
| 12,262,275 | B2 * | 3/2025 | Deenoo | H04W 76/20 |
| 12,308,978 | B2 * | 5/2025 | Turtinen | H04L 1/1883 |
| 12,309,785 | B2 * | 5/2025 | Matsumura | H04B 7/0695 |
| 12,309,820 | B2 * | 5/2025 | Lee | H04W 72/21 |
| 12,362,812 | B2 * | 7/2025 | Huang | H04B 7/088 |
| 2016/0227428 | A1 * | 8/2016 | Novlan | H04W 24/10 |
| 2020/0177357 | A1 * | 6/2020 | Zhou | H04L 27/2692 |
| 2020/0221495 | A1 | 7/2020 | Chen et al. | |
| 2022/0394763 | A1 * | 12/2022 | Wang | H04W 24/04 |
| 2022/0400396 | A1 * | 12/2022 | Alfarhan | H04W 72/20 |
| 2023/0171837 | A1 * | 6/2023 | Zhou | H04B 7/0695 370/329 |
| 2023/0180326 | A1 * | 6/2023 | Zheng | H04W 76/18 370/225 |

FOREIGN PATENT DOCUMENTS

| | | | | |
|---|---|---|---|---|
| CN | 110431901 | A | 11/2019 | |
| CN | 110710311 | A | 1/2020 | |
| CN | 111586739 | A | 8/2020 | |
| EP | 2621114 | A1 | 7/2013 | |
| EP | 3179764 | B1 * | 8/2024 | H04L 5/0073 |
| EP | 3949591 | B1 * | 9/2024 | H04L 5/0053 |
| WO | WO 2019/157689 | A1 | 8/2019 | |
| WO | WO 2019/161548 | A1 | 8/2019 | |
| WO | WO 2020/061931 | A1 | 4/2020 | |
| WO | WO-2020159172 | A1 * | 8/2020 | H04W 72/23 |

OTHER PUBLICATIONS

"Revised WID on enhancement of data collection for SON/MDT in NR and EN-DC", 3GPP TSG RAN meeting #88-e, RP-201281, Agenda: 9.10.14, CMCC, Jun. 26-Jul. 3, 2020, 5 pages.

"3rd Generation Partnership Project; Technical Specification Group Radio Access Network; NR; Medium Access Control (MAC) protocol specification (Release 16)", 3GPP TS 38.321, V16.1.0, Jul. 2020, pp. 1-151.

"Open Issues in SON", 3GPP TSG-RAN WG2 Meeting #111-e, R2-2007071, Agenda: 8.13.2, Qualcomm Incorporated, Aug. 17-28, 2020, 3 pages.

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

"Msc-generator", Sourceforge, Retrieved on Oct. 10, 2024, Webpage available at :https://sourceforge.net/projects/msc-generator/.

"IEEE 802.11", Wikipedia, Retrieved on Oct. 10, 2024, Webpage available at : https://en.wikipedia.org/wiki/IEEE_802.11.

Extended European Search Report received for corresponding European Patent Application No. 20958222.0, dated Jun. 27, 2024, 13 pages.

"Handling consistent UL LBT failures", 3GPP TSG-RAN WG2 #109-e, R2-2001207, Agenda: 6.2.2.2, Ericsson, Feb. 24-Mar. 6, 2020, 15 pages.

"Enhancements for Logged MDT and RLFreporting", 3GPP TSG-RAN WG2 Meeting #112 Electronic, R2-2009434, Agenda: 8.13. 3.2, Nokia, Nov. 2-13, 2020, 8 pages.

* cited by examiner

100

200

600

FAILURE CANCELLATION RECORDING

CROSS REFERENCE TO RELATED APPLICATION

This patent application is a U.S. National Stage application of International Patent Application Number PCT/CN2020/122927 filed Oct. 22, 2020, which is hereby incorporated by reference in its entirety.

FIELD

Embodiments of the present disclosure generally relate to the field of telecommunication and in particular, to methods, devices, apparatuses and computer readable storage medium for recording of failure cancellation.

BACKGROUND

The new radio in unlicensed spectrum (NR-U) intends to expand the applicability of fifth generation (5G) new radio (NR) access technology to support operation in unlicensed bands. NR-U provides operators more spectrum option when deploying 5G networks.

Further, self-organizing networks (SON), which encompasses solutions for network self-configuration and self-optimization, was introduced in long term evolution (LTE) to support deployment of the system and performance optimization. SON solutions can be divided into three categories: self-configuration, self-optimization and self-healing. As a part of self-healing, minimization of drive tests (MDT) enables terminal devices (e.g., user equipments (UEs)) to provide the same type of information as those collected in drive test. A great advantage is that UEs can retrieve and report parameters from indoor environments. Thus, enhancement of data collection for SON/MDT in NR is being studies.

SUMMARY

In general, example embodiments of the present disclosure provide a solution of mobility for recording of a cancellation of a failure.

In a first aspect, there is provided a first device. The first device comprises at least one processor; and at least one memory including computer program code; the at least one memory and the computer program code are configured to, with the at least one processor, cause the first device to detect a cancellation of a reporting of a failure for a transmission between the first device and a second device; and in accordance with a determination that the cancellation of the reporting of the failure is detected, record information concerning the cancellation.

In a second aspect, there is provided a second device. The second device comprises at least one processor; and at least one memory including computer program code; the at least one memory and the computer program code are configured to, with the at least one processor, cause the second device to receive information from a first device, the information concerning a cancellation of a reporting of a failure for a transmission between the first device and the second device In a third aspect, there is provided a method. The method comprises detecting, at a first device, a cancellation of a reporting of a failure for a transmission between the first device and a second device; and in accordance with a determination that the cancellation of the reporting of the failure is detected, recording information concerning the cancellation.

In a fourth aspect, there is provided a method. The method comprises receiving, at a second device, information from a first device, the information concerning a cancellation of a reporting of a failure for a transmission between the first device and the second device.

In a fifth aspect, there is provided a first apparatus. The first apparatus comprises means for detecting, at a first apparatus, a cancellation of a reporting of a failure for a transmission between the first apparatus and a second apparatus; and means for in accordance with a determination that the cancellation of the reporting of the failure is detected, recording information concerning the cancellation.

In a sixth aspect, there is provided a second apparatus. The second apparatus comprises means for receiving information from a first apparatus, the information concerning a cancellation of a reporting of a failure for a transmission between the first apparatus and the second apparatus.

In a seventh aspect, there is provided a computer-readable medium comprising program instructions for causing an apparatus to perform at least the method according to any one of the above third to fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
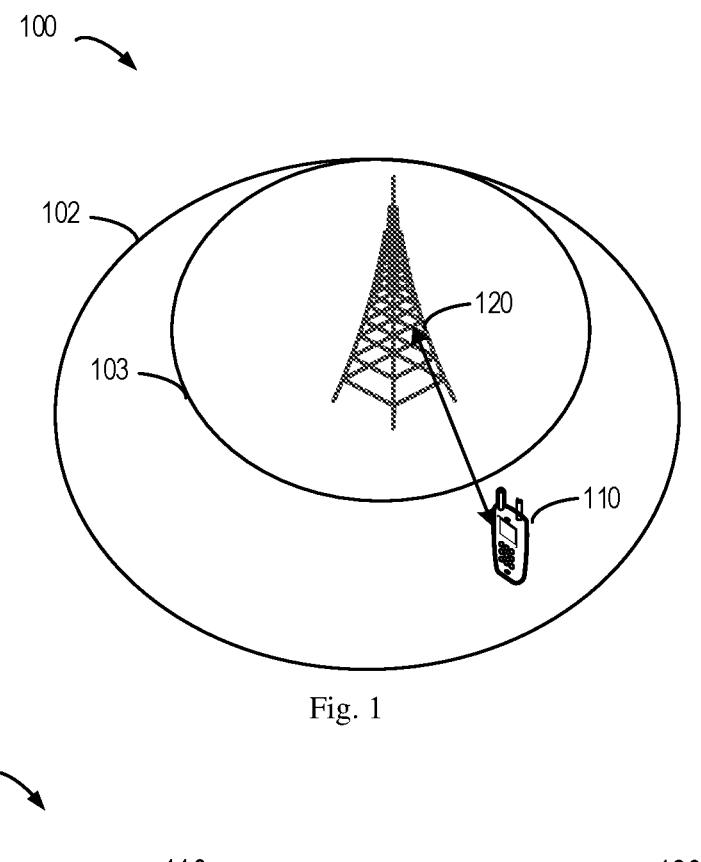
FIG. 1 illustrates an example communication network in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure.

The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as long term evolution (LTE), LTE-advanced (LTE-A), wideband code division multiple access (WCDMA), high-speed packet access (HSPA), narrow band Internet of things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a remote radio unit (RRU), a radio header (RH), a remote radio head (RRH), an integrated access and backhaul (IAB) node, a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some example embodiments of the present disclosure. It is noted that example embodiments of the present disclosure are equally applicable to other resources in other domains.

As mentioned above, NR-U, which is used as one of access technology in 5G, provides more spectrum options. SON is introduced for network self-configuration and self-optimization; and MDT enables terminal devices to provide information as those collected in drive test, thus facilitate data retrieval and report from indoor environments. Enhancement of data collection for SON/MDT in NR is being studies.

NR-U related SON/MDT optimization may reuse the existing NR-U measurements. Whereas, the main difference for NR-U compared to licensed band is that both the network device and terminal device needs to do LBT detection before performing transmission, otherwise since the same unlicensed band may also be used by other systems (such as wireless fidelity (wifi) and bluetooth), there will be inter-system interferences, resulting in unsatisfying quality of reception signals. As a result, mechanisms related to consistent LBT failures detection and recovery are designed.

Accordingly, the medium access control (MAC) entity of a terminal device may be configured by radio resource control (RRC) with a consistent LBT failure recovery procedure. Consistent LBT failure is detected per UL bandwidth part (BWP) by counting LBT failure indications, for all UL transmissions, from the lower layers to the MAC entity.

Moreover, actions, such as BWP switching, secondary cell (Scell) deactivation and radio resource control (RRC) reconfiguration might be triggered by the network device at any point in time due to different reasons. For example, switching a terminal device to from one BWP to another one (e.g., to a narrower BWP or a wider BWP) may be performed to adapt to traffic or as a response to the LBT failure medium access control (MAC) control element (CE) or beam failure recovery (BFR) MAC CE reception. In another example, SCells deactivation may be triggered by the network device when no more data is to be transmitted for power saving purpose.

The inventors of the present disclosure noticed that, the triggered consistent LBT failure for a cell could be cancelled not only upon transmission of the LBT failure MAC CE for Scell (instead of upon network response to the MAC CE) but also upon radio access (RA) completion for PCell, BWP switching, SCell deactivation, RRC reconfiguration, and the like, which are more to cover the cases due to other reasons. For these cases, the network device would not know there had been consistent LBT failure occurrence(s).

For instance, the network device may be switching the BWP of a terminal device to a narrow BWP due to lack of data activity (e.g., when the bwp-InactivityTimer associated with the Scell timeout) while the terminal device tried to send scheduling request (SR) (e.g., over a physical uplink control channel (PUCCH) SCell) upon uplink data arrival but failed due to consistent LBT failure. When the SR then succeeds in the other BWP, the network device may switch the terminal device back to the wider BWP to transmit the data but the LBT problem kicks in again.

In another example, when LBT failure happens on a PCell, the terminal device would switch to another BWP to perform random access channel (RACH), and then switch to another one if consistent LBT failure also happens there until it has tried all the BWPs configured with RACH or succeeds in one. LBT MAC CE is reported if RACH on the BWP that does not fail and the triggered LBT failure is cancelled. Otherwise, radio link failure (RLF) and consequently re-establishment is triggered when all the BWPs with RACH are failed. Whereas, only a bitmap of the serving cells is included in the LBT MAC CE indicating which cell(s) are experiencing consistent LBT failure without indicating of how many BWP(s) the terminal device has tried.

To sum up, the inventors of the present disclosure noticed that the knowledge of possible LBT failure cancellation may be not feasible to be obtained by the network device because the triggered LBT failure as mentioned above may be cancelled in some scenarios (e.g., random access (RA) completion for primary cell (PCell), BWP switching, SCell deactivation, RRC reconfiguration) at the terminal device without noticing the network device.

In another example, the medium access control (MAC) entity of a terminal device may be configured by radio resource control (RRC) with a beam failure recovery (BFR) procedure for either special cell (SpCell, PCell or PSCell) or SCell, or both. Beam failure may be detected per DL bandwidth part (BWP) or per serving cell by counting beam failure instance (BFI) indications from the lower layers to the MAC entity. In some examples, when the terminal device attempts to report the detected beam failure in a BFR procedure, it prepares a BFR MAC CE which is used to indicate the serving cells with beam failure as well as possible availability of a new candidate beam. However, in some examples, if the network device deactivates an SCell while the terminal device attempted to report a beam failure with BFR MAC CE, the triggered BFR is cancelled for that SCell. In this case, the network device would not be aware that there was a beam failure for an SCell in the terminal device when it deactivated the SCell. This may become an issue the next time the network device activates the SCell for the terminal device since the failed beam may not be used for communication.

Accordingly, according to some example embodiments of the present disclosure, there is provided a solution for recording of a cancellation of a failure. In this solution, the terminal device, detect a cancellation of a reporting of a failure for a transmission between the terminal device and a network device. Then in accordance with a determination that the cancellation of the reporting of the failure is detected, record information concerning the cancellation. The terminal device is able to provide the recorded information on failure cancellation to the network device when needed. As a result, the failure cancellation knowledge is able to be available to the network device.

FIG. 1 shows an example communication environment 100 in which example embodiments of the present disclosure can be implemented. In the communication environment 100, a plurality of communication devices, including a first device 110 and a second device 120 can communicate with each other.

In the example of FIG. 1, the first device 110 is illustrated as a terminal device while the second device 120 is illustrated as a network device serving the terminal device. The serving area of the second device 120 may be called a cell 102.

It is to be understood that the number of devices and their connections shown in FIG. 1 are only for the purpose of illustration without suggesting any limitation. The environment 100 may include any suitable number of devices adapted for implementing embodiments of the present disclosure. Although not shown, it would be appreciated that one or more additional devices may be located in the cell 102, and one or more additional cells may be deployed in the environment 100. It is noted that although illustrated as a network device, the second device 120 may be other device than a network device. Although illustrated as a terminal device, the first device 110 may be other device than a terminal device.

In some example embodiments, if the first device 110 is a terminal device and the second device 120 is a network device, a link from the second device 120 to the first device 110 is referred to as a downlink (DL), while a link from the first device 110 to the second device 120 is referred to as an uplink (UL). In DL, the second device 120 is a transmitting (TX) device (or a transmitter) and the first device 110 is a receiving (RX) device (or a receiver). In UL, the first device 110 is a TX device (or a transmitter) and the second device 120 is a RX device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: code division multiple access (CDMA), frequency division multiple access (FDMA), time division multiple access (TDMA), frequency division duplex (FDD), time division duplex (TDD), multiple-input multiple-output (MIMO), orthogonal frequency division multiple (OFDM), discrete Fourier transform spread OFDM (DFT-s-OFDM) and/or any other technologies currently known or to be developed in the future.

Figure 2:
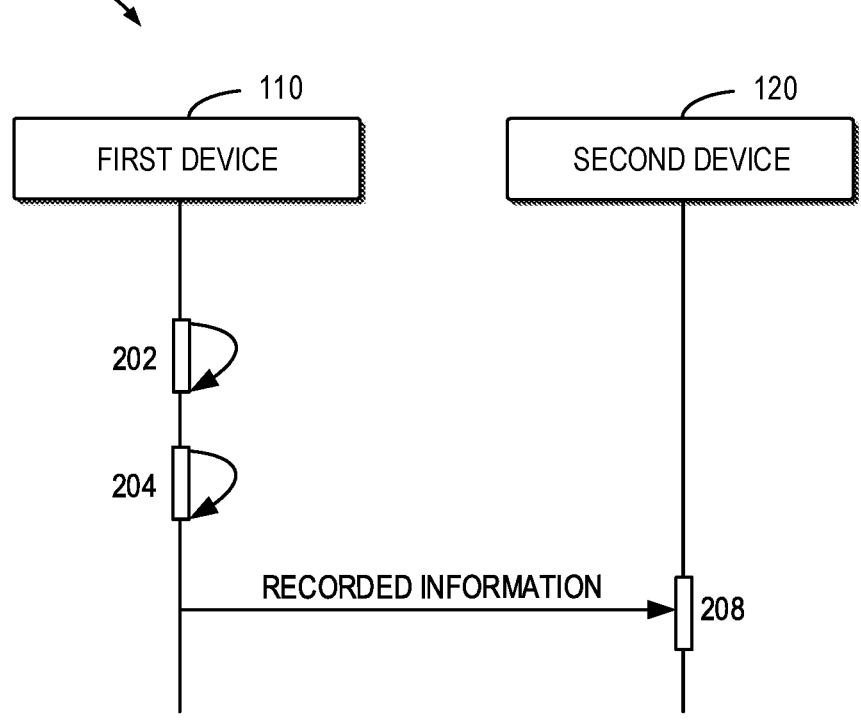
FIG. 2 illustrates a signaling flow for recording of a failure cancellation in accordance with some example embodiments of the present disclosure.

Reference is now made to FIG. 2, which shows a signaling flow 200 for recording of a failure cancellation in accordance with an embodiment of the present disclosure. For the purpose of discussion, the signaling flow 200 will be described with reference to FIG. 1. The signaling flow 200 may involve the first device 110, the second device 120 as illustrated in FIG. 1.

As shown in FIG. 2, the first device 110 detects 202 a cancellation of a reporting of a failure for a transmission between the first device 110 and a second device 120. For example, the failure may be a LBT failure or a beam failure. Then, if it is determined that the cancellation of the reporting of the failure is detected, the first device 110 records 204 information concerning the cancellation.

As such, the first device 110 is able to transmit the recorded information on failure cancellation to the second device 120 when needed. That is, the failure cancellation knowledge is able to be obtained by the second device 120. Meanwhile, upon receiving 208 the recorded information, the second device 120 is able to be aware of the cancelled failure from reported information for better resource management purpose.

Figure 3:
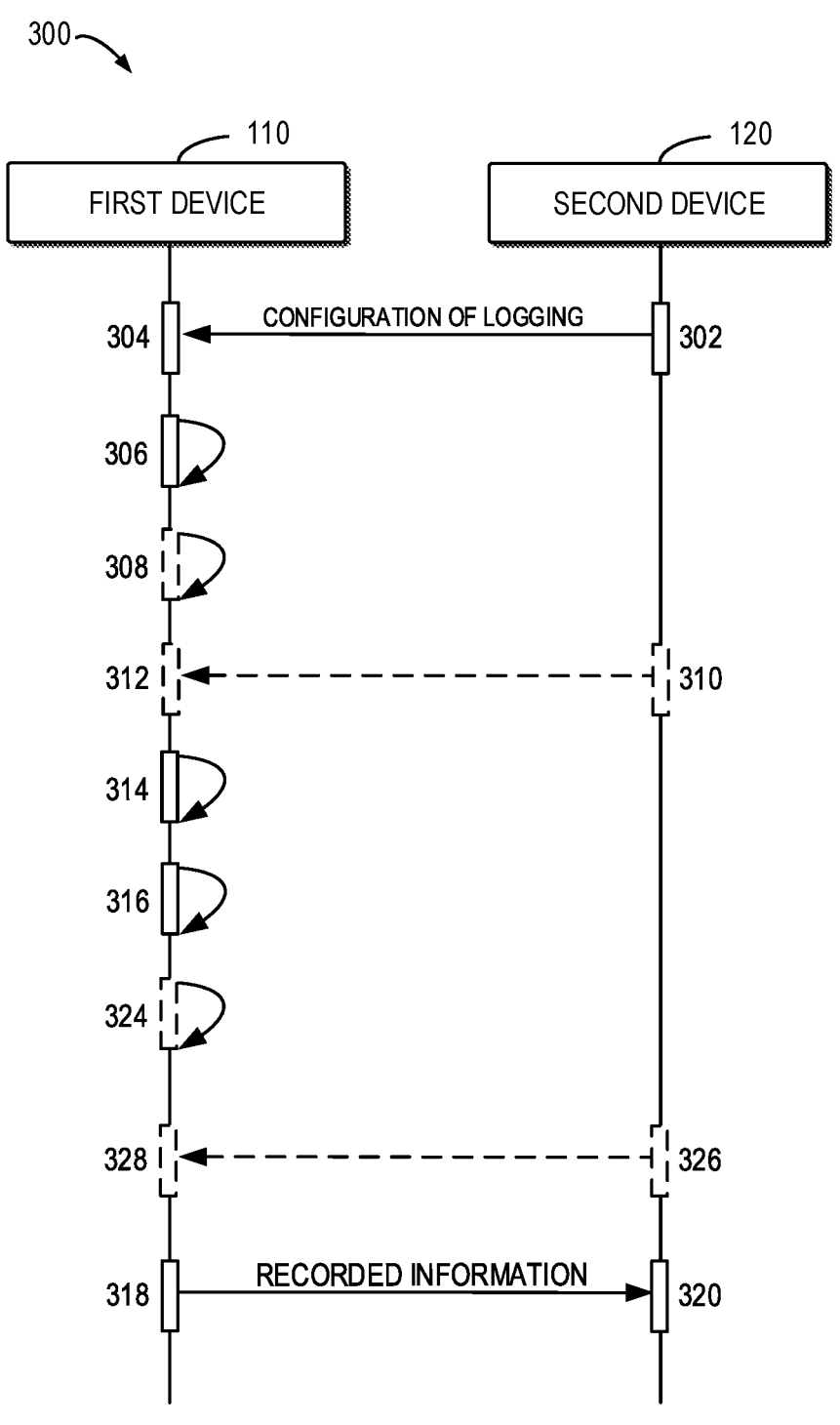
FIG. 3 illustrates a signaling flow for recording of a LBT failure cancellation in accordance with some other example embodiments of the present disclosure.

Reference is not made to FIG. 3, which shows a signaling flow 300 for recording of a LBT failure cancellation in accordance with an embodiment of the present disclosure. For the purpose of discussion, the signaling flow 300 will be described with reference to FIG. 1. The signaling flow 300 may involve the first device 110, the second device 120 as illustrated in FIG. 1.

As shown in FIG. 3, in some example embodiments, the second device 120 (e.g., a gNB) may transmit 302, to the first device 110, a message to configure the first device 110 with a configuration to record cancelled LBT failures. In such embodiments, when the first device 110 receives 304 the configuration from the second device 120, the recording of a cancellation of a LBT failure may be triggered at the first device 110. In some other embodiments, the second device 120 may transmit, to the first device 110, a message indicating the first device 110 not to record the cancelled LBT failure. That is, the second device 120 may configure the first device 110 whether to records information concerning the cancellation. The first device 110 may perform accordingly then.

In some example embodiment, the second device 120 may indicate under which conditions the first device 110 may be triggered to record LBT failure cancellation via transmitting a message to the first device 110 (not shown). In one example, the first device 110 may be triggered to be record a cancellation a LBT failure only and for any reason unknown to the second device 120. In another example, the first device 110 may be triggered to record a cancellation of a LBT failure upon experiencing certain amount of LBT failures. Alternatively, the first device 110 may be triggered to record a cancellation of a LBT failure upon occasions that may cause LBT failure cancellation (e.g., BWP switch, SCell deactivation (via MAC CE or upon SCell deactivation timer expiry), successful completion of random access procedure triggered by consistent LBT failure on PCell, RRC reconfiguration of LBT parameters, and the like).

In some example embodiments, the first device 110 may be preconfigured locally that the cancellation of LBT failures is recorded at the first device 110 side. In some other embodiments, the first device 110 may perform recording of the cancellation of the LBT failure by default. The first device 110 may perform recording in other ways which is not mentioned herein, and the scope of the present application is not limited in this regard.

In some example embodiments, the first device 110 may attempt 306 an uplink transmission. For example, the first device 110 may attempt to transmit data to the second device 120, but a consistent LBT failure is detected.

For example, when the serving cell in which LBT failures occurred is configured with LBT failure recovery configuration, a LBT failure detection timer may be started when LBT failure indication has been received from lower layers (e.g., a physical layer of a first device 110). The LBT failure detection timer may be configured with a predetermined value and a maximum number of counts. A LBT counter may be incremented by one each time once a LBT failure indication is received. If the maximum number of counts is not reached and the LBT failure detection timer expires, the LBT counter will be reset. Otherwise, if the maximum number of counts for the LBT failure is reached before the LBT failure detection timer expires, consistent LBT failure is triggered at the first device 110 for the active UL BWP in the serving cell. Once the first device 110 detects the consistent LBT failures, a reporting may be triggered at the first device 110.

In some example embodiments, if SCell deactivation timer (e.g., sCellDeactivationTimer) expires 308 prior to reporting, to the second device 120, the consistent LBT failures, first device 110 may cancel 314 the triggered consistent LBT failure for the Scell.

In some example embodiments, the second device 120 may transmit 310 an indication (e.g., transmits a Scell Activation/Deactivation MAC CE) to the first device 110, to deactivate at least one serving cell for the first device 110. Upon receiving 312 the Scell Activation/Deactivation MAC CE, the first device 110 may cancel the triggered LBT failures for the Scell.

Besides Scell Activation/Deactivation, there may also other occasions in which the triggered LBT failure reporting may cancelled. In the following part, a few more occasions will be introduced.

In some example embodiments, the second device 120 may transmit an indication that the second device 120 decides to switch the BWP for a serving cell of the first device 110. For example, the second device 120 may transmit, to the first device 110, a PDCCH transmission for BWP switching. In some examples, a serving cell may be configured with one or more BWPs and the maximum number of BWPs per serving cell may be defined. The BWP switching for a serving cell is used to activate an inactive BWP and deactivate an active BWP at a time. In one example, the second device 120 may decide to switch the first device 110 from a wider BWP to a narrower BWP on the same carrier in the serving cell due to lack of data activity. In such example embodiments, upon receiving the indication of BWP switching, the first device 110 may cancel the triggered LBT failure.

In some example embodiments, the second device 120 may transit, to the first device 110, a message for reconfiguration of LBT parameters for the first device 110. For example, the message may be a RRC message. In such example embodiments, the LBT parameters may include, but is not limited to, a LBT failure detection timer (i.e., lbt-FailureDetectionTimer), a maximum count of LBT failure instance (i.e., lbt-FailureInstanceMaxCount), and the like. In such example embodiments, upon receiving the message for reconfiguration of the LBT parameters, the first device 110 may cancel the triggered LBT failures.

In one example, a counter for the LBT failures might be counted to nine, while the received reconfiguration of the maximum count of LBT failure instance is eight. In such example, the counter for the LBT failures will be reset and the triggered LBT failures will be cancelled due to the reception of the reconfiguration of LBT parameters.

In some example embodiments, the cancellation of the LBT failure may be triggered by a successful completion of random access procedure triggered by consistent LBT failure in the PCell.

Now returning back to FIG. 3, in some example embodiments, the first device 110 may record 316 the cancellation of the LBT failure. The first device 100 may record LBT failure cancellation in various ways, the details of which will be elaborated more in the following part.

In some example embodiments, the first device 110 may record the cancellation of the LBT failure that is triggered upon occasions that cause or trigger the LBT failure cancellation. For example, the first device 110 may record the causes which may include, but is not limited to, a BWP switch, a Scell deactivation (via MAC CE or upon SCell deactivation timer expiry), a successful completion of random access procedure triggered by consistent failure on PCell, a RRC reconfiguration of parameters, and the like.

As such, when different LBT failure cancellation occasions are triggered, each occasion is able to be recorded accordingly and stored in the memory of the first device 110 for further reporting to the second device 120. Accordingly dedicated report content is able to be provided to the second device 120 to draw right conclusion on associated events that led to LBT failure cancellation.

Alternatively or additionally, in some example embodiments, the first device 110 may only record the cancellation of the LBT failure has occurs. In such example embodiments, the LBT failure cancellation may be triggered for any reason that is unknown to the second device 120. In some other example embodiments, the first device 110 may record the cancellation of the LBT failure that are triggered upon experiencing certain amount of LBT failures, that is, the cancellation of the LBT failure is triggered upon the occurrences of the amount of LBT failures exceeding a predetermined of times.

In some example embodiments, the first device 110 may record the identification of a LBT sub-channel (e.g., a LBT sub-channel ID) on which the first device 110 performed LBT and failed. Further, in some example embodiments, the first device 110 may record the identity of a BWP (e.g., a BWP ID) on which the first device 110 performed LBTs but failed. For example, one BWP may include a plurality of LBT sub-channels and each LBT sub-channel may be 20 M. Each BWP, having a size of 60 M, may include three LBT sub-channel with a size of 20 M each. Thus, the first device 110 may record on which specific BWP and which 20 M LBT sub-channel the LBT failures occurred, that is, the first device 110 may record both the BWP ID and the LBT sub-channel ID with respect to the LBT failures. In another example, the first device 110 may record both the LBT sub-channel ID and the corresponding serving ID on which the cancellation of the reporting of the LBT failure occurs. In some example embodiments, the first device 110 may record the physical channel type (e.g., a SR, physical random access channel (PRACH), sounding reference signal (SRS), PUCCH, physical uplink shared channel (PUSCH) etc.) on which the first device 110 performed LBT and failed.

Alternatively, in some examples, the first device 110 may record the identity of the serving cell (e.g., a service cell ID) on which the first device 110 performed LBTs but failed. Similarly, the first device 110 may also record the serving cell ID as well as the BWP IDs and the sub-channel IDs on which the LBT failures occurs but was cancelled and not reported to the second device 120.

Continuing with FIG. 3, in some example embodiments, the first device 110 may report 318 the recorded information. Upon receiving 320 the recorded information, the second device 120 is able to be aware of the cancelled consistent LBT failure from reported information for better resource management purpose. For example, the second device 120 is able to use the information as a reference for future selection of BWP or serving cell for the first device 110.

As mentioned above, for the case that a successful completion of random access procedure triggered by consistent LBT failure in the PCell, the consistent LBT failure may firstly occur on one BWP of the PCell for the first device 110, and the first device 110 may try a few BWPs for RACH, however not until a RACH is successfully performed on a BWP, a MAC CE may be reported. In such case, a few other BWPs might have been tried but failed LBT. As such, the second device 120 would not have chance to know which BWPs has been tried but failed LBT. With the above procedure, the first device 110 is able to record the cancellation of the LBT failure and report it when needed for any BWP that has been tried but failed LBT.

In some example embodiments, based on a related configuration locally, the first device 110 may trigger 324 the reporting of the recorded information immediately once the information is recorded. In some other example embodiments, the second device 120 may transmit 326 an indication to the first device 110. For example, the second device 120 may request recorded information reporting from the first device 110. Upon receiving 328 such indication, the first device 110 may report the recorded information about the cancellation of the LBT failure to the second device 120.

Alternatively or additionally, in some example embodiments, the first device 110 may transmit an indication of LBT failure (not shown), for example, via a MAC CE message. In such embodiments, if the MAC protocol data unit (PDU) is transmitted and LBT failure indication is not received from lower layer and this MAC PDU includes the LBT failure MAC CE, then the triggered consistent LBT failure in SCell for which consistent LBT failure was indicate in the transmitted LBT failure MAC CE is cancelled. In such example embodiments, the consistent LBT failure has been notified to the second device 120, thus the recording of the cancellation of the LBT failure may not be triggered. That is, if it is determined that the cancellation of the report of the LBT failure is detected prior to an indication associated with the LBT failure has been transmitted from the first device 110 to the second device 120, the information concerning the cancellation is recorded. Meanwhile, the recording may be limited to the cases when consistent LBT failure is cancelled before the LBT MAC CE has been transmitted, since otherwise the second device 120 knows at least the current active BWP of the indicated serving cell failed based on receiving the MAC CE.

Figures 4, 5:
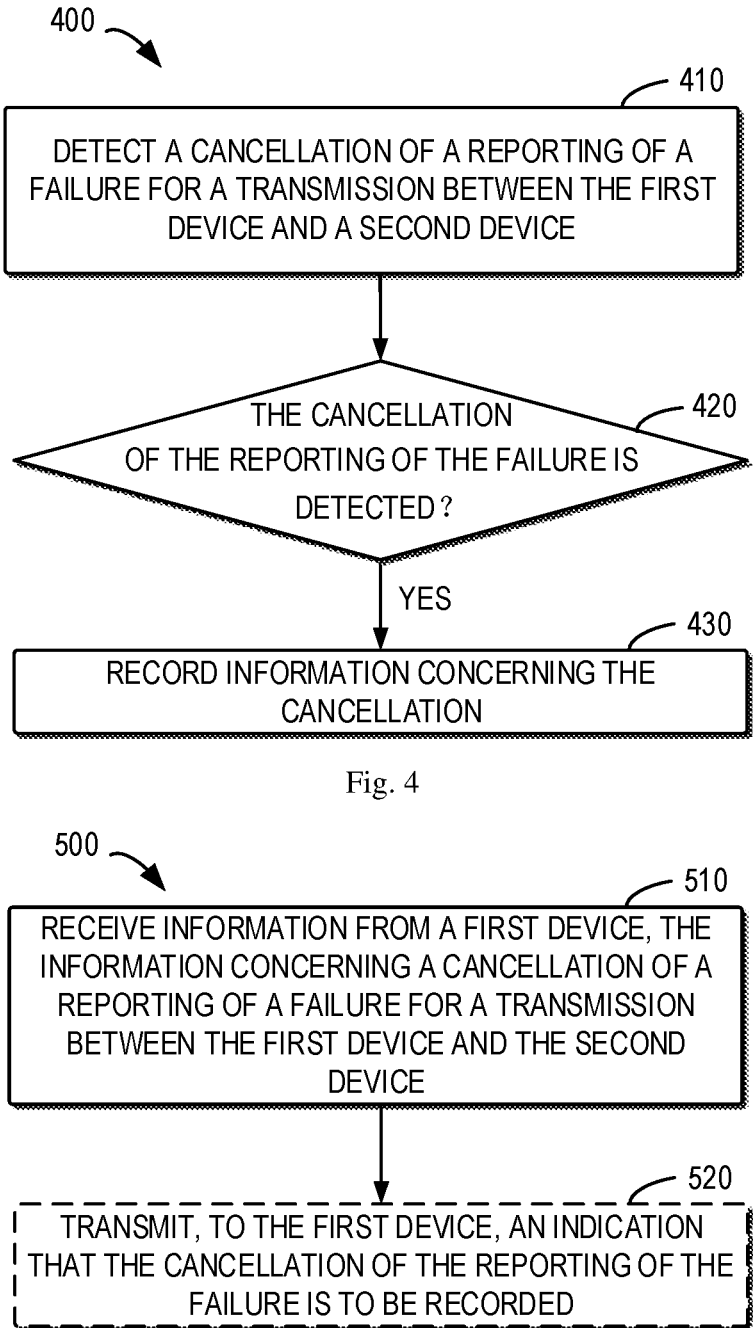
FIG. 4 illustrates a flowchart of a method implemented at a first device in accordance with some example embodiments of the present disclosure.
FIG. 5 illustrates a flowchart of a method implemented at a second device in accordance with some example embodiments of the present disclosure.

FIG. 4 illustrates a flowchart of a method 400 implemented at the first device 110 in accordance with some example embodiments of the present disclosure. For the purpose of discussion, the method 400 will be described from the perspective of the first device 110 with reference to FIG. 1.

At block 410, the first device detects a cancellation of a reporting of a failure for a transmission between the first device and a second device. At block 420, in accordance with a determination that the cancellation of the reporting of the failure is detected, the first device record information concerning the cancellation.

In some example embodiments, the failure comprises at least one of a listen-before-talk failure and a beam failure.

In some example embodiments, the reporting of the failure comprises at least one of a failure detection and a failure indication.

In some example embodiments, the method 400 further comprises transmit the recorded information concerning the cancellation to the second device.

In some example embodiments, the recorded information is transmitted in response to a request from the second device.

In some example embodiments, the recording the information concerning the cancellation comprises in accordance with an indication that the cancellation of the reporting of the failure is to be recorded, recording the information concerning the cancellation.

In some example embodiments, the indication is received from the second device.

In some example embodiments, the recorded information comprises a cause of cancellation of the failure comprising at least one of: a bandwidth part switch for a serving cell for the first device, a deactivation of a secondary cell for the first device, a successful completion of a random access procedure triggered by the failure on a primary cell for the first device, a reconfiguration of parameters related to the failure, or occurrences of an amount of failures exceeding a predetermined of times.

In some example embodiments, the recorded information comprises at least one of: an identity of a serving cell on which the cancellation of the reporting of the failure occurs, an identity of a bandwidth part of the serving cell on which the cancellation of the reporting of the failure occurs, an identity of a sub-channel of the serving cell on which the cancellation of the reporting of the failure occurs, an identity of a sub-channel of the bandwidth part on which the cancellation of the reporting of a listen-before-talk failure occurs, and an uplink physical channel type on which the cancellation of the reporting of a listen-before-talk failure occurs.

In some example embodiments, the recording the information concerning the cancelation comprises in accordance with a determination that the cancellation of the report of the failure is detected prior to an indication associated with the failure has been transmitted from the first device to the second device, recording the information concerning the cancellation.

In some example embodiments, instead of recording LBT failure cancellation, the first device may record UE LBT failure per LBT subchannel, or per UL channel type (e.g., SR, PRACH, SRS, PUCCH, PUSCH), based on which the second device can derive which subchannel was experiencing consistent LBT failure and adjust the resource management accordingly. In some example embodiments, LBT failures exceeding a configured threshold number is recorded to skip reporting of sporadic failures. It should be noted the threshold could be lower than the threshold value of triggering the consistent LBT failure so that such LBT failure events can be recorded before the consistent LBT failure is triggered or before SR failure/RACH failure is triggered. In some example embodiments, it could be limited that only continuous LBT failures are counted for the LBT failure events, i.e., in case there is successful transmission, the counting starts from zero. Such LBT failure reporting may be recorded and reported independently from the consistent LBT failure detection and recovery/SR failure/RACH failure, for instance, based on the second device's request or the first device's spontaneous report when available. In some example embodiments, the LBT failures may be reported upon triggering of the consistent LBT failure by the first device. The triggering condition for recording may be signalled by the second device as recording configuration. Following the configuration, the first device may provide the report back to the second device specifically for LBT failure types. Further, the first device may also report separately (from other records/logs) and notify the second device by LBT-specific information about availability indicator (so that the first device signals: LBT-failure available, network request only LBT specific log).

In some example embodiments, the first device is a terminal device and the second device is a network device.

FIG. 5 illustrates a flowchart of a method 500 implemented at a second device in accordance with some example embodiments of the present disclosure. For the purpose of discussion, the method 500 will be described from the perspective of the second device 120 with reference to FIG. 1.

At block 510, the second device receives information from a first device, the information concerning a cancellation of a reporting of a failure for a transmission between the first device and the second device. At block 520, in some example embodiments, the second device may transmit, to the first device, an indication that the cancellation of the reporting of the failure is to be recorded.

In some example embodiments, the failure comprises at least one of a listen-before-talk failure and a beam failure.

In some example embodiments, the reporting of the failure comprises at least one of a failure detection and a failure indication.

In some example embodiments, the information is received in response to a request from the second device.

In some example embodiments, the method 500 further comprises transmitting, to the first device, an indication that the cancellation of the reporting of the failure is to be recorded.

In some example embodiments, the recorded information comprises a cause of cancellation of the failure comprising at least one of: a bandwidth part switch for a serving cell for the first device, a deactivation of a secondary cell for the first device, a successful completion of a random access procedure triggered by the failure on a primary cell for the first device, a reconfiguration of parameters related to the failure, or occurrences of an amount of failures exceeding a pre-determined of times.

In some example embodiments, the recorded information comprises at least one of: an identity of a serving cell on which the cancellation of the reporting of the failure occurs, an identity of a bandwidth part of the serving cell on which the cancellation of the reporting of the failure occurs, an identity of a sub-channel of the serving cell on which the cancellation of the reporting of the failure occurs, an identity of a sub-channel of the bandwidth part on which the cancellation of the reporting of a listen-before-talk failure occurs, and an uplink physical channel type on which the cancellation of the reporting of a listen-before-talk failure occurs.

In some example embodiments, the first device is a terminal device and the second device is a network device.

In some embodiments, a first apparatus capable of performing any of the method 400 (for example, the first device 110) may comprise means for performing the respective steps of the method 400. The means may be implemented in any suitable form. For example, the means may be implemented in a circuitry or software module.

In some embodiments, the first apparatus comprises means for detecting, at a first apparatus, a cancellation of a reporting of a failure for a transmission between the first apparatus and a second apparatus; and means for in accordance with a determination that the cancellation of the reporting of the failure is detected, recording information concerning the cancellation.

In some example embodiments, the failure comprises at least one of a listen-before-talk failure and a beam failure.

In some example embodiments, the reporting of the failure comprises at least one of a failure detection and a failure indication.

In some example embodiments, the first apparatus further comprises means for transmitting the recorded information concerning the cancellation to the second apparatus.

In some example embodiments, the recorded information is transmitted in response to a request from the second apparatus.

In some example embodiments, the means for recording the information concerning the cancellation comprises means for in accordance with an indication that the cancellation of the reporting of the failure is to be recorded, recording the information concerning the cancellation.

In some example embodiments, the indication is received from the second apparatus.

In some example embodiments, the recorded information comprises a cause of cancellation of the failure comprising at least one of: a bandwidth part switch for a serving cell for the first apparatus, a deactivation of a secondary cell for the first apparatus, a successful completion of a random access procedure triggered by the failure on a primary cell for the first apparatus, a reconfiguration of parameters related to the failure, or occurrences of an amount of failures exceeding a pre-determined of times.

In some example embodiments, the recorded information comprises at least one of: an identity of a serving cell on which the cancellation of the reporting of the failure occurs, an identity of a bandwidth part of the serving cell on which the cancellation of the reporting of the failure occurs, an identity of a sub-channel of the serving cell on which the cancellation of the reporting of the failure occurs, an identity of a sub-channel of the bandwidth part on which the cancellation of the reporting of a listen-before-talk failure occurs, and an uplink physical channel type on which the cancellation of the reporting of a listen-before-talk failure occurs.

In some example embodiments, the means for recording the information concerning the cancelation comprises means for in accordance with a determination that the cancellation of the report of the failure is detected prior to an indication associated with the failure has been transmitted from the first apparatus to the second apparatus, recording the information concerning the cancellation.

In some example embodiments, the first apparatus is a terminal device and the second apparatus is a network device.

In some embodiments, a second apparatus capable of performing any of the method 500 (for example, the second device 120) may comprise means for performing the respective steps of the method 500. The means may be implemented in any suitable form. For example, the means may be implemented in a circuitry or software module.

In some example embodiments, the second apparatus comprises: means for receiving information from a first apparatus, the information concerning a cancellation of a reporting of a failure for a transmission between the first apparatus and the second apparatus.

In some example embodiments, the failure comprises at least one of a listen-before-talk failure and a beam failure.

In some example embodiments, the reporting of the failure comprises at least one of a failure detection and a failure indication.

In some example embodiments, the information is received in response to a request from the second apparatus.

In some example embodiments, the second apparatus further comprises means for transmitting, to the first apparatus, an indication that the cancellation of the reporting of the failure is to be recorded.

In some example embodiments, the recorded information comprises a cause of cancellation of the failure comprising at least one of: a bandwidth part switch for a serving cell for the first apparatus, a deactivation of a secondary cell for the first apparatus, a successful completion of a random access procedure triggered by the failure on a primary cell for the first apparatus, a reconfiguration of parameters related to the failure, or occurrences of an amount of failures exceeding a pre-determined of times.

In some example embodiments, the recorded information comprises at least one of: an identity of a serving cell on which the cancellation of the reporting of the failure occurs, an identity of a bandwidth part of the serving cell on which the cancellation of the reporting of the failure occurs, an identity of a sub-channel of the serving cell on which the cancellation of the reporting of the failure occurs, an identity of a sub-channel of the bandwidth part on which the cancellation of the reporting of a listen-before-talk failure occurs, and an uplink physical channel type on which the cancellation of the reporting of a listen-before-talk failure occurs.

In some example embodiments, the first apparatus is a terminal device and the second apparatus is a network device.

Figure 6:
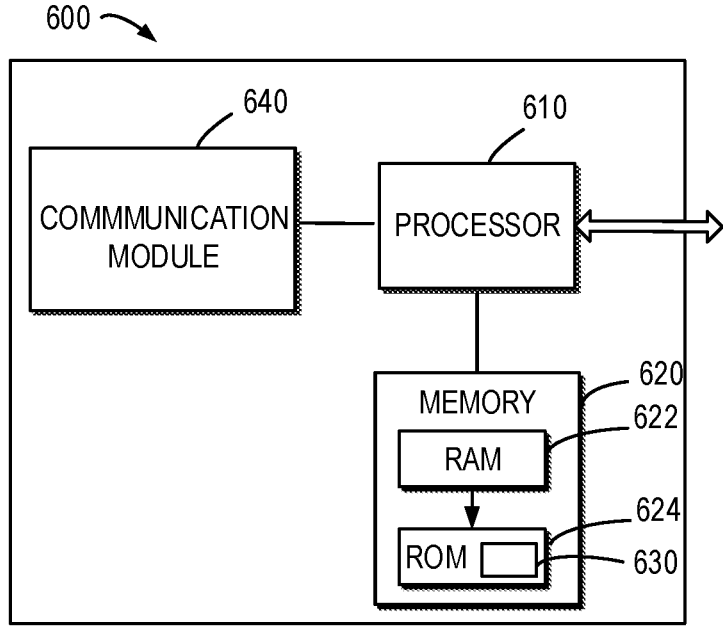
FIG. 6 illustrates a simplified block diagram of a device that is suitable for implementing example embodiments of the present disclosure.
Figure 7:
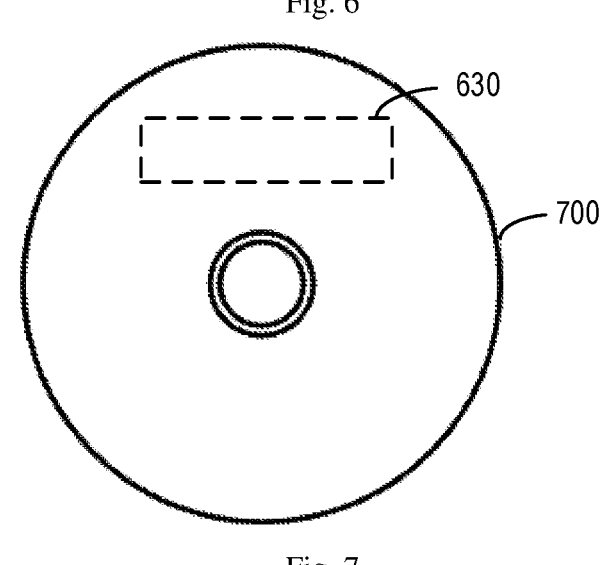
FIG. 7 illustrates a block diagram of an example computer readable medium in accordance with some example embodiments of the present disclosure.

FIG. 6 is a simplified block diagram of a device 600 that is suitable for implementing embodiments of the present disclosure. The device 600 may be provided to implement the communication device, for example the first device 110, the second device 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a read only memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program 630 so that the device 600 may perform any process of the disclosure as discussed with reference to FIGS. 2 to 5. The embodiments of the present disclosure may also be implemented by hardware or by a combination of software and hardware.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 11 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400-500 as described above with reference to FIGS. 4-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:

at least one processor; and at least one non-transitory memory; storing instructions that, when executed with the at least one processor, cause the terminal device to:

detect a cancellation of a reporting of a failure for a transmission between the terminal device and a network device, wherein the failure comprises at least one of a listen-before-talk failure or a beam failure; and in accordance with a determination that the cancellation of the reporting of the failure is detected, record information concerning the cancellation, the information comprising an explicit cancellation record indicating that the reporting of the failure was cancelled and including a cancellation cause, and at least one of: an identity of a sub-channel of the bandwidth part on which the cancellation of the reporting of a listen-before-talk failure occurs; or an uplink physical channel type on which the cancellation of the reporting of a listen-before-talk failure occurs;

wherein the instructions, when executed with the at least one processor, cause the terminal device to transmit the recorded cancellation record to the network device in a message that is independent of and distinct from any listen-before-talk failure or beam failure recovery message.

2. The terminal device of claim 1, wherein the terminal device records the cancellation in response to a determination that a number of continuous listen-before-talk failures has reached a threshold lower than a threshold for triggering consistent listen-before-talk failure detection.

3. The terminal device of claim 1, wherein the reporting of the failure comprises at least one of a failure detection or a failure indication.

4. The terminal device of claim 1, wherein the recorded cancellation record indicates that the cancellation cause comprises switching from a wider bandwidth part to a narrower bandwidth part on a same carrier for a serving cell.

5. The terminal device of claim 1, wherein the cancellation record is reported independently from consistent listen-before-talk failure detection and recovery, scheduling request failure, or random access failure, including in response to a request from the network device.

6. The terminal device of claim 1, wherein the instructions, when executed with the at least one processor, cause the terminal device to record the information concerning the cancellation with, in accordance with an indication that the cancellation of the reporting of the failure is to be recorded, recording the information concerning the cancellation.

7. The terminal device of claim 6, wherein the indication is received from the network device.

8. The terminal device of claim 1, wherein the recorded information comprises a cause of cancellation of the failure comprising:

a bandwidth part switch for a serving cell for the terminal device, a deactivation of a secondary cell for the terminal device, a successful completion of a random access procedure triggered with the failure on a primary cell for the terminal device, a reconfiguration of parameters related to the failure, and occurrences of an amount of failures exceeding a predetermined number of times.

9. The terminal device of claim 1, wherein the recorded information comprises:

an identity of a serving cell on which the cancellation of the reporting of the failure occurs, an identity of a bandwidth part of the serving cell on which the cancellation of the reporting of the failure occurs, an identity of a sub-channel of the serving cell on which the cancellation of the reporting of the failure occurs, an identity of a sub-channel of the bandwidth part on which the cancellation of the reporting of a listen-before-talk failure occurs, and an uplink physical channel type on which the cancellation of the reporting of a listen-before-talk failure occurs.

10. The terminal device of claim 1, wherein the instructions, when executed with the at least one processor, cause the terminal device to record the information concerning the cancellation with, in accordance with a determination that the cancellation of the report of the failure is detected prior to an indication associated with the failure being transmitted from the terminal device to the network device, recording the information concerning the cancellation.

11. The first terminal device of claim 1, wherein the recorded cancellation record includes both: (i) an identity of a sub-channel of the bandwidth part on which the cancellation of the reporting of a listen-before-talk failure occurs; and (ii) an uplink physical channel type on which the cancellation of the reporting of the listen-before-talk failure occurs.

12. A network device, comprising:

at least one processor; and at least one non-transitory memory storing instructions that, when executed with the at least one processor, cause the network device to:

receive information from a terminal device, the information comprising an explicit recorded cancellation record indicating that a reporting of a failure was cancelled and including a cancellation cause and at least one of: an identity of a sub-channel of a bandwidth part on which the cancellation of the reporting of a listen-before-talk failure occurs; or an uplink physical channel type on which the cancellation of the reporting of a listen-before-talk failure occurs; wherein the explicit recorded cancellation record is received in a message that is independent of and distinct from any listen-before-talk failure recovery or beam failure recovery message.

13. The network device of claim 12, wherein the recorded cancellation record, when received, indicates that the cancellation was detected prior to an indication associated with the failure having been transmitted from the terminal device to the network device.

14. The network device of claim 12, wherein the reporting of the failure comprises cancellation of a failure detection and cancellation of a failure indication.

15. The network device of claim 12, wherein the instructions, when executed with the at least one processor, cause the network device to: (i) request, from the terminal device, a cancellation record; and (ii) responsive to the request, receive the cancellation record indicating that a reporting of the failure was cancelled and including a cancellation cause and at least one of: an identity of a sub-channel of a bandwidth part on which the cancellation of the reporting of a listen-before-talk failure occurs; or an uplink physical channel type on which the cancellation of the reporting of the listen-before-talk failure occurs.

16. The network device of claim 12, wherein the instructions, when executed with the at least one processor, cause the network device to transmit, to the terminal device, an indication that the cancellation of the reporting of the failure is to be recorded.

17. The network device of claim 12, wherein the recorded reported information comprises a cause of cancellation of the failure comprising:

a bandwidth part switch for a serving cell for the terminal device, a deactivation of a secondary cell for the terminal device, a successful completion of a random access procedure triggered with the failure on a primary cell for the terminal device, a reconfiguration of parameters related to the failure, and occurrences of an amount of failures exceeding a predetermined number of times.

18. The network device of claim 12, wherein the reported information comprises:

an identity of a serving cell on which the cancellation of the reporting of the failure occurs, an identity of a bandwidth part of the serving cell on which the cancellation of the reporting of the failure occurs, an identity of a sub-channel of the serving cell on which the cancellation of the reporting of the failure occurs, an identity of a sub-channel of the bandwidth part on which the cancellation of the reporting of a listen-before-talk failure occurs, and an uplink physical channel type on which the cancellation of the reporting of a listen-before talk failure occurs.

19. The network device of claim 12, wherein the indication transmitted to the terminal device configures the terminal device to record cancellation of listen-before-talk failures only when continuous listen-before-talk failures are counted and using a threshold lower than a threshold value for triggering consistent listen-before-talk failure detection.

20. A method, comprising:

detecting a cancellation of a reporting of a failure for a transmission between the terminal device and a network device, wherein the failure comprises a listen-before-talk failure or a beam failure; and in accordance with a determination that the cancellation of the reporting of the failure is detected, recording information concerning the cancellation, the information comprising an explicit cancellation record indicating that the reporting of the failure was cancelled and including a cancellation cause, and at least one of: an identity of a sub-channel of the bandwidth part on which the cancellation of the reporting of a listen-before-talk failure occurs; or an uplink physical channel type on which the cancellation of the reporting of a listen-before-talk failure occurs;

transmitting the recorded cancellation record to the network device in a message that is independent of and distinct from any listen-before-talk failure recovery or beam failure recovery message.

* * * * *